July 19, 1955 K. H. BURGSMÜLLER 2,713,282
NIBBLING CUT

Filed July 25, 1951 5 Sheets-Sheet 1

KARL HEINRICH BURGSMÜLLER
INVENTOR
by James J. Cannon
ATTORNEY

July 19, 1955  K. H. BURGSMÜLLER  2,713,282
NIBBLING CUT

Filed July 25, 1951  5 Sheets-Sheet 2

KARL HEINRICH BURGSMÜLLER
INVENTOR
ATTORNEY

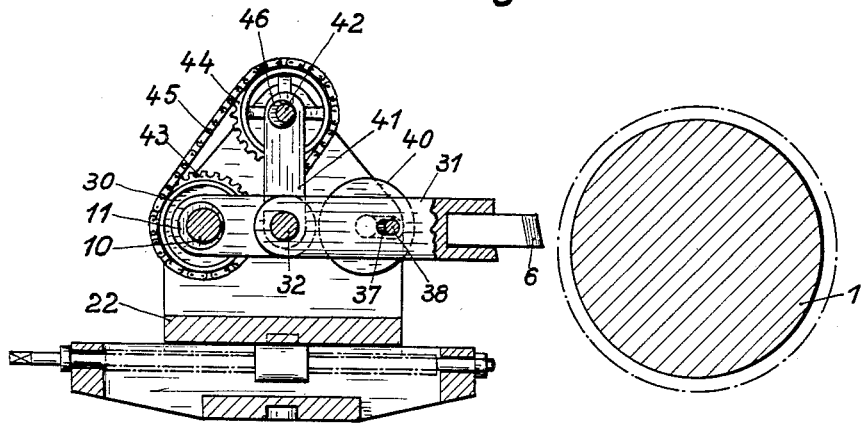
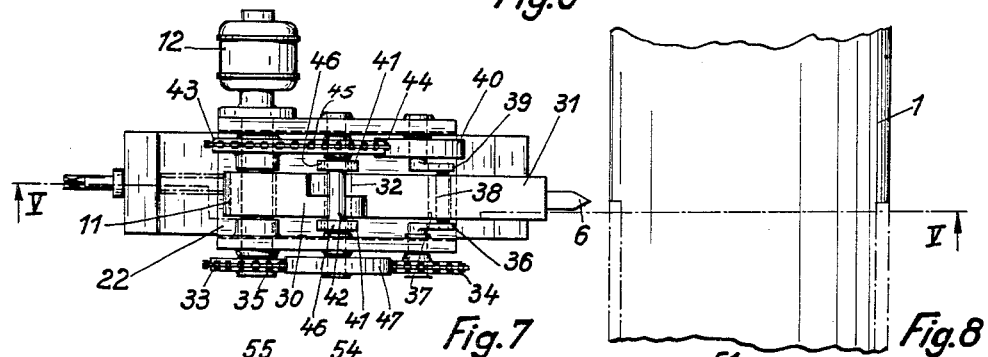
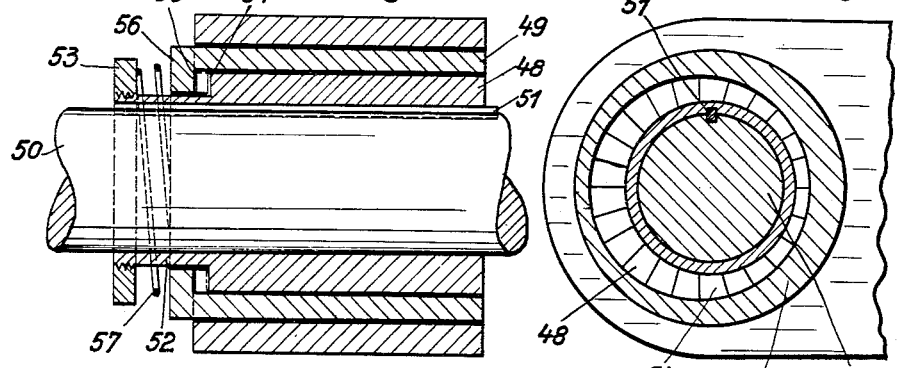
Fig. 5 · Fig. 6 · Fig. 7 · Fig. 8
KARL HEINRICH BURGSMÜLLER
INVENTOR July 19, 1955 K. H. BURGSMÜLLER 2,713,282
NIBBLING CUT
Filed July 25, 1951 5 Sheets-Sheet 4

KARL HEINRICH BURGSMÜLLER
INVENTOR
by James J. Cavino, ATTORNEY

July 19, 1955  K. H. BURGSMÜLLER  2,713,282
NIBBLING CUT
Filed July 25, 1951  5 Sheets-Sheet 5
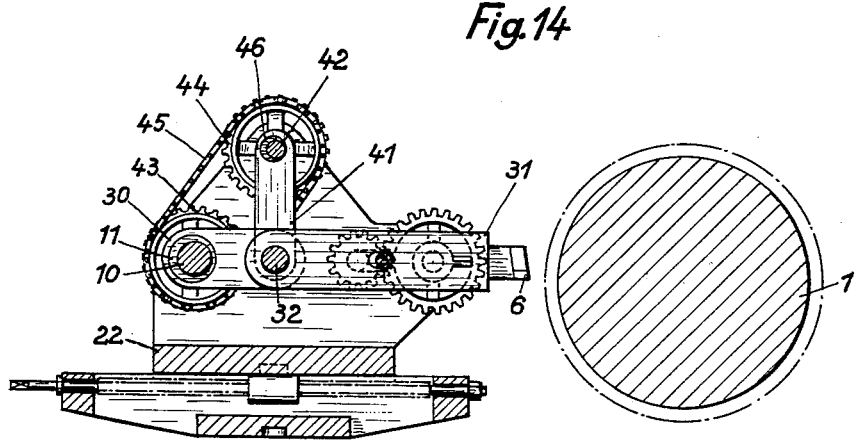
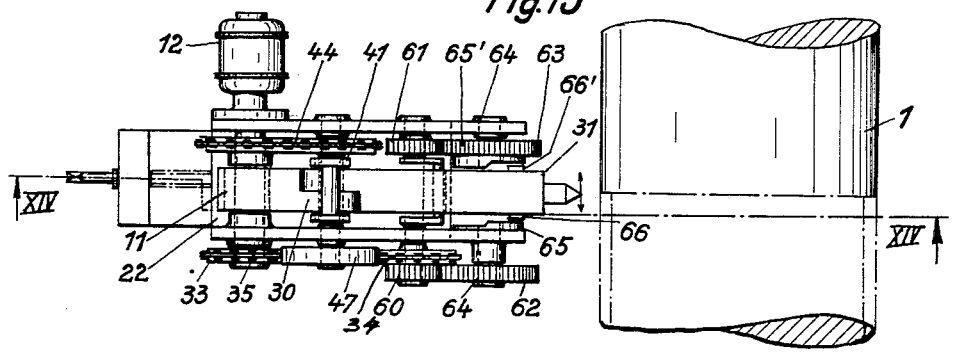
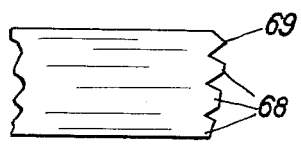
KARL HEINRICH BURGSMÜLLER
INVENTOR
by James J. Cannon
ATTORNEY United States Patent Office 2,713,282
Patented July 19, 1955

2,713,282

NIBBLING CUT

Karl Heinrich Burgsmüller, Kreiensen am Harz, Niedersachsen, Germany, assignor to Gomerue Establishment, Vaduz, Liechtenstein Application July 25, 1951, Serial No. 238,501

2 Claims. (Cl. 82—1)

This invention relates to certain improvements in or relating to the machining of cylindrical workpieces by the nibbling cut more particularly the cutting of threads or the like.

It is an object of the present invention to provide methods and means for increasing the cutting speed while using relatively inexpensive hard metal tipped tools rotating radially about an axis and working with a high frequency intermittent cut, because of which these tools do not heat up appreciably.

Such tools because of their low mean temperature show a remarkably long life particularly when the single flank cut, V thread, is used. The cutting path of the tool is followed by a cooling path through the free air of several times the length of the cutting path, which sufficiently cools the tool tip. In case of large diameter external threads with the tool rotating around the workpiece a single cutting path may be so long that the tool tip rotating at normal cutting speed loses its cutting edge in a single cut. The subsequent cooling path cannot restore the said cutting edge.

It is an important feature of the present invention that said drawbacks occurring especially with the cutting of metal workpieces of diameters of approximately 8" and over can be avoided by causing a cutting tool to intermittently engage the surface to be cut by oscillating movements directed radially to the axis of the workpiece and harmonizing its oscillating speed and the speed of rotation of the workpiece in such a manner that it performs a short cut followed by a relatively long cooling path, by a subsequent cut.

In carrying out said "nibbling" cut, the oscillating motion of the tool may be carried out in a closed curve resulting in a tangential cut. In the case of the single flank cut it is advantageous to impart to the tool an additional swinging, or pendulous movement, in an axial direction of the workpiece so that successive cuts are carried out in an alternate order on two flanks of the thread facing each other.

Other and further objects, features and advantages of the invention will be pointed out hereinafter and appear in the appended claims forming part of the application.

In the accompanying drawings several now preferred embodiments of arrangements for carrying out the invention are shown by way of illustration and not by way of limitation.

Fig. 1 is a side view, partly in section, of a threading machine adapted for carrying out the method according to the present invention including its drive, mounted on a lathe of conventional type, Fig. 2 is a fragmentary plan view thereof, partly in section, Fig. 3 is a section on line III—III of Fig. 4, showing a threading device for carrying out the invention, with two oscillating drives, the workpiece and the tool slide of a lathe carrying the device, Fig. 4 is a plan view thereof, partly in section, Fig. 5 is a section line V—V of Fig. 6, showing a threading device for carrying out the process according to the invention, with three oscillating drives, the workpiece, and the top slide of a lathe carrying the device, Fig. 6 is a plan view thereof, Figs. 7 and 8 are longitudinal and cross sections of an adjusting device for the eccentric of the oscillating drives, on a larger scale, Figs. 9 and 10 are perspective or sectional views of details, Figs. 11 and 12 are diagrammatic representations of the cutting angle of the tool, Fig. 13 is a plan view of a threading device for carrying out the method according to the invention including the parts carrying the same, with feeding of the tool at one half of the flank angle.

Fig. 14 is a section on line XIV—XIV of Fig. 15, showing a threading device for carrying out the method according to the invention, including four oscillating drives for the tool, the workpiece, and the top slide of a lathe carrying the device, Fig. 15 is a plan view thereof, Fig. 16 is a plan view of a tool adapted for cutting a multiple thread by the method according to the invention, and Fig. 17 is a plan view of a multi-point tool.

Similar reference numerals denote similar parts in the different views.

Referring to the drawings Fig. 1, it will be seen that a cylindrical workpiece 1 to be threaded is clamped in the chuck 2 of a lathe rotated by motor 5 through gears 3 and 4. A cutting tool 6 corresponding to the profile of the thread to be cut is mounted in tool holder 7, seated in casing 8 so as to be movable radially to the axis of the workpiece. The other end of the tool holder 7 is formed with a recess 9 into which projects an eccentric 11 mounted on a shaft 10. The driving shaft 10 is connected with motor 12 attached to one side of casing 8. Casing 8 is mounted on the tool rest 13 of the lathe which is fixably and adjustably supported by means of a swivel plate 14 on a cross slide 15 which in turn is slidably guided on the bottom slide 16. The bottom slide is movable on the lathe bed 18 in an axial direction of the workpiece, by means of a drivable lead screw 17. The eccentric shaft 10 is provided, on the side facing away from the motor 12, with a flywheel 19 for compensating the mass forces.

It will be understood that if the eccentric 11 is driven by motor 12 while workpiece 1 is set in rotation by motor 5 through gears 3 and 4, and tool 6 is fed by the lead screw 17, the tip of the tool 6 will carry out an oscillating motion by which it is radially moved in rapid succession to and from the rotating workpiece 1. The speed of the oscillating tool 6 is timed with the feed in an axial direction of the workpiece 1 and with the speed of rotation of the workpiece 1, in such away that with each single cutting engagement it will carry out a short cut only at high speed and after a cooling path is followed by the next short cut, thus a very neat thread can be produced at a very high speed by a single cut.

In a further embodiment of a device for carrying out my novel method, as shown in Figs. 3 and 4, the tool 6 is provided with a second oscillating drive. The flywheel keyed to the motor shaft 10 is used as a gear 20 meshing with a second gear 23 rotating in side wall 21 of U-shaped casing 22. Gear 23 is connected with a crank pin 25 projecting through an opening 24 of the tool holder 7, to a crank disc 28 mounted on a pin 27 at the opposite side wall 26 of the casing 22.

The bores in the gear 23 and disc 28 for holding the ends of the crank pin 25 are made as radial slots 29 and the opening 24 in the tool holder 7 is a longitudinal slot. The ends of the crank pin are threaded, a lock nut being screwed on to each of the parts projecting outwards through the radial slots 29.

By co-ordinating the eccentric drive 10, 11 and the crank drive 23, 25, 28, set in rotation by motor 12 the tool 6 is imparted a movement conforming to an elliptical path. The shape of the elliptical path can be varied by adjusting the crank pin 25 in the radial slots 29 of the gear 23 and disc 28 in relation to the workpiece 1 for carrying out tangential cuts.

With the combined movement of the eccentric drive 10, 11, and the crank drive 23, 25, 28 a continual change in the speed of the tip 6 during its travel on its indicated elliptical course is effected so that the cut itself is carried out at varying rates of speed. As a result, the chip is being removed from the workpiece at a continual varying angle so that the face of the tool is not always stressed and therefore heated at the same place. The heat produced by the cutting action is thereby distributed over a larger tool area, thus increasing the service life of the tool.

Furthermore the tool on its elliptical course traverses its free path at a higher rate of speed than its cutting path, thus increasing the production because of a higher cutting frequency.

In the embodiment of a device for carrying out the invention as shown in Figs. 5 and 6 the tool holder carried by the U-shaped casing 22 consists of two parts 30 and 31 which are jointedly connected by a pin 32. The part 30 of the tool holder facing away from the workpiece 1 is provided with the eccentric drive 10, 11 to be set in rotation by the motor 12, and the part 31 facing the workpiece 1 is provided with a crank drive.

Sprockets 33, 34 and a chain 35 transmit the motion from the motor shaft 10 to the crank drive 34, 36, 38, 39 and 40. The shaft of the driven sprocket 34 carries a crank arm 36 which is connected by a crank pin 38 projecting through a longitudinal slot 37 in the tool holder part 31, to a crank arm 39 of a flywheel disc 40 mounted in the opposite wall of the casing 22. The crank pin 38 is adjustably and fixably secured in longitudinal slots of its arms 36, 39.

The link pin 32 of the tool holder parts 30, 31 is connecting said parts on each side to links 41. Each link 41 is also connected to an eccentric 46 mounted on the shaft 42. Links 41 can be set in vertical reciprocating motion by the eccentric drive 42, 46, mounted in the side walls of the casing 22, above the link pin 32. The shaft 42 of this eccentric drive 42, 46, is also driven from the motor shaft 10, by sprockets 43, 44, and a chain 45. The shaft 42 carries a flywheel 47 for compensating the mass forces.

By coordination of the said parts driven by motor 12, the section of the curved course of the tool 6 forming the cutting path conforms to the circumference of the workpiece 1.

The throw of the eccentrics used may be set as shown by way of example in Figs. 7 and 8.

According to the embodiment shown in Figs. 7 and 8 each eccentric comprises two eccentric sleeves 48 and 49, one placed inside the other. The inner sleeve 48, being keyed to shaft 50 by key 51. Said eccentric sleeve 48 is provided on one side with a threaded extension collar 52 holding a threaded ring 53.

The eccentric sleeve 48 is provided with teeth 54 on the side having the threaded extension collar 52, to engage with correspondingly shaped teeth 55 on the side ring 56 of the outer eccentric sleeve 49. A helical spring 57 is placed between the threaded ring 53 and the ring 56, to hold the eccentric sleeves 48 and 49 in position. By sliding the outer sleeve 49 laterally on the inner sleeve 48, the teeth 54 and 55 will be unmeshed to allow an angular adjustment of the outer sleeve 49 in relation to the inner sleeve 48. The spring 57 will remesh teeth 54, and 55 of said sleeves 48 and 49. Thus the throw of the eccentric is adjustable from zero up to its maximum eccentricity.

Fig. 9 shows a tool provided with a tip 6 of the hard carbide type.

Fig. 10 shows tool holder 7 provided with a bore 58 connected to a compressed air supply. Said bore opening out near the tool tip 6 into a cup 59 directed against the tip 6 of the tool. Thus a very effective cooling of the tip 6 of the tool is achieved with a minimum amount of cooling air.

In operating the above described devices, the tool, when cutting, is always equally stressed on both cutting edges removing V-shaped chips from the workpiece 1, as diagrammatically shown in Fig. 11. In order to lengthen the service life and improve the performance of the tool, preferably one flank only of the tool is used for the thread cutting operation, as shown diagrammatically in Fig. 12.

This can be accomplished, for example, with a device as shown in Figs. 1 and 2, by providing a tool 6 whose cutting edge is ground similar to a side cutting tool and which is arranged in such a way, that it is in relation to a vertical plane to the workpiece axis, turned by one half of the angle of the thread, as shown in Fig. 13. The casing 8 carrying the tool holder is swung on the slide of the lathe in such a manner that the holder of the tool 6 carries out its oscillating motion in the direction of one-half of the angle of the thread from the said vertical plane.

It has been found that the destruction of the hard alloy tool tip in thread cutting is not due to the continual interruptions of the cut but that the tendency of the tip to be destroyed is decreased as the cutting stresses on the two flanks of the tip differ. In fact the tip is exposed to the least destruction when the entire cutting work is done by one flank only while the other flank is entirely free from doing any cutting work.

Such a tool can be made to cut a chip several times the thickness comparable to those in high speed steel practice and yet using cutting speeds corresponding with those of the conventional surface turning with hard alloy tool tips. This advantage results, among others from the fact that in single flank cutting the removed chips can be carried off towards the side of the non-cutting flank.

A further embodiment of a device for carrying out the single flank cutting process by moving the tool tip in a closed curve is shown in Figs. 14 and 15. The construction of the tool holder and the oscillating drives in this case is the same as that shown in, and described with reference to Figs. 5 and 6. However, the sprocket 34 is coupled with a gear 60 and the flywheel disc 40 is designed as a gear 61 corresponding to the size of gear 60. The gears 60 and 61 are meshing with gears 62 and 63 which are twice the size of gears 60 and 61 and are mounted on a common shaft 64 said shaft being located in the side walls of casing 22. Each of the gears 62, 63 have cams 65 and 65' on the side facing the oscillating tool holder 31, said cams facing each other, and engage lateral stops 66 and 66' of the tool holder 31. Cams 65 and 65' oppose one another and when driven impart an oscillating motion to the tool holder 31, the resultant motion, between this oscillating motion and the one described above with reference to Figures 5 and 6 follows a closed curve. By selecting a transmission ratio of 1:2 for said oscillating drive, the tool is alternately engaged during one stroke with one flank of the thread and in the next stroke with the adjacent flank of the thread, resulting in the removal of flat chips, and obtaining particularly smooth cut surfaces.

By suitable dimensioning of the cams 65, and 65' it is possible to obtain chips with a continually changing cross section. Resulting also in a change of the angle, under which the chips are taken off the workpiece, and the stress on the tool is distributed over a larger work surface, and thus effecting a longer life of the tool.

Fig. 16 shows a special tool 67 with hard metal tips for cutting each fillet of a multiple thread usable in the above described device.

Fig. 17 shows a multi-tooth tool whose first teeth 68 serve as roughing teeth while the profile of the last tooth 69 corresponds exactly to the profile of the thread to be cut.

Figure 1:
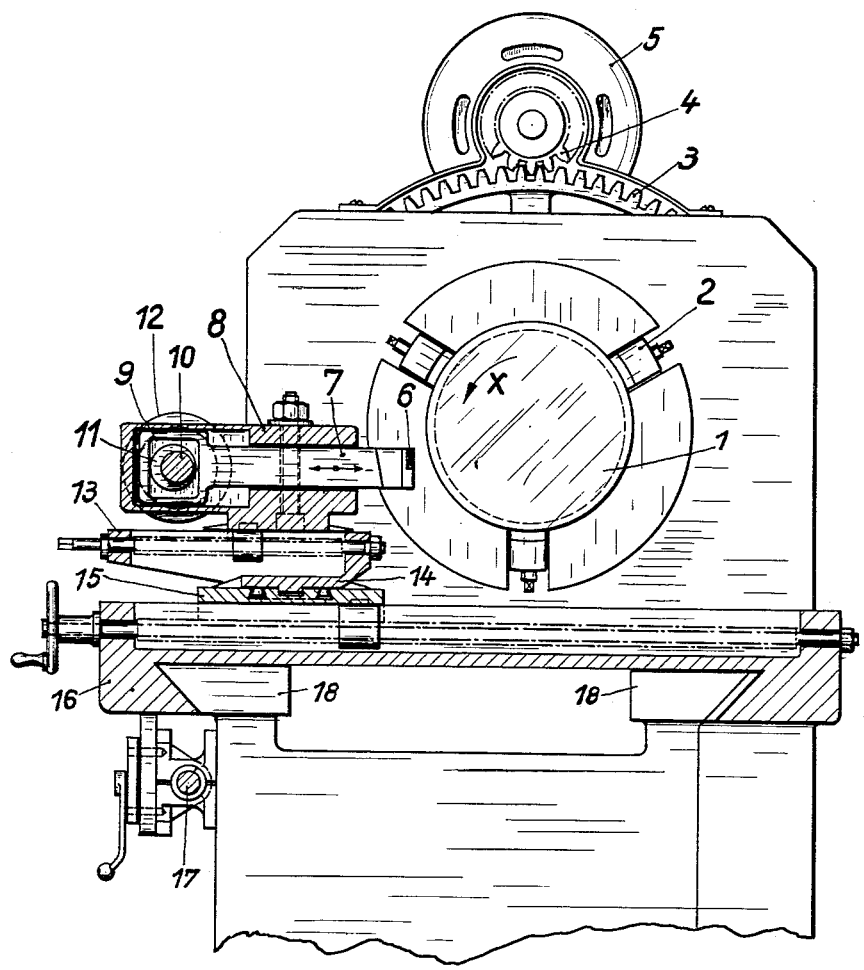
Figure 9:
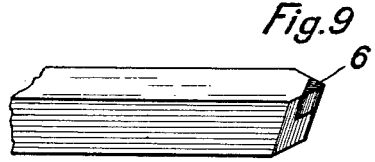
Figure 2:
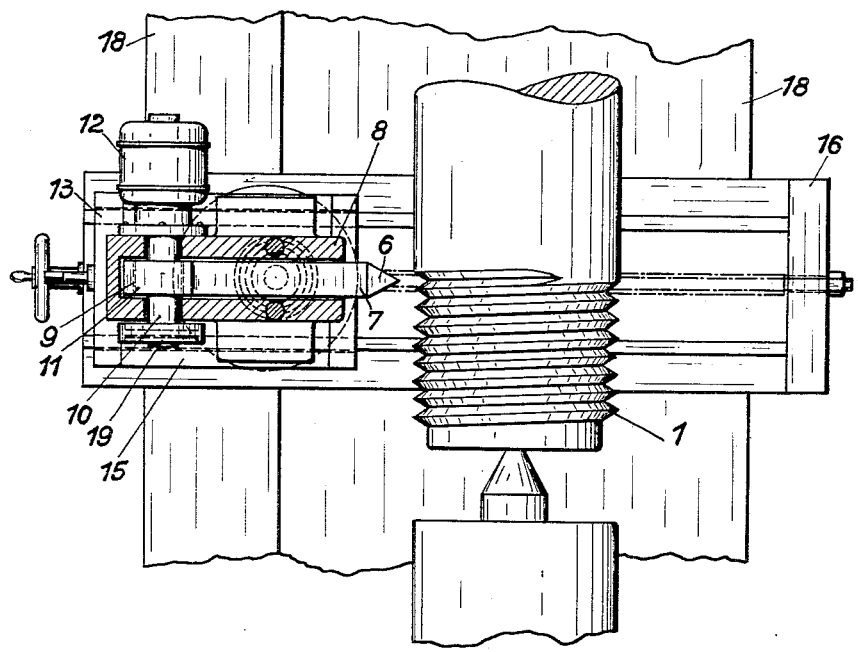
Figure 3:
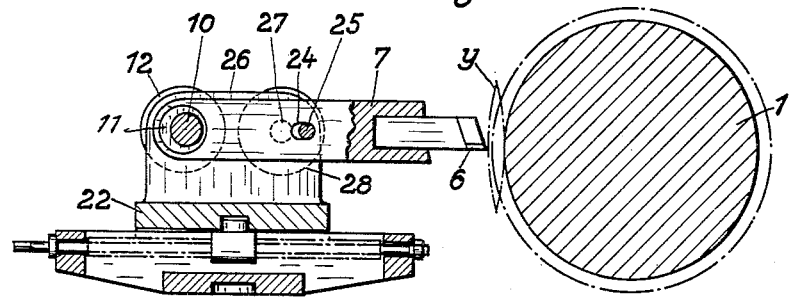
Figure 4:
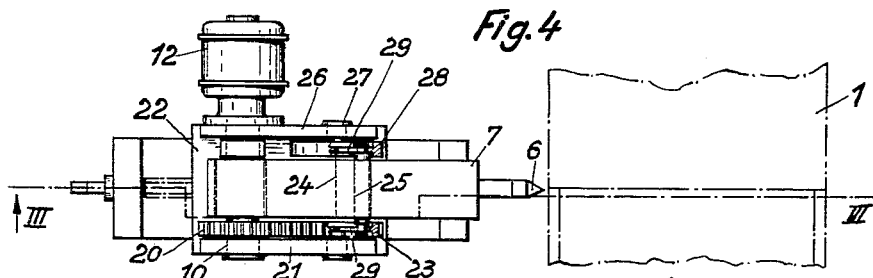
Figure 10:
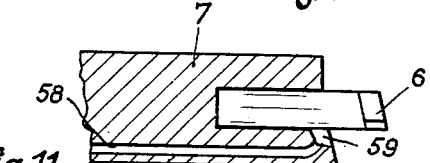
Figure 11:
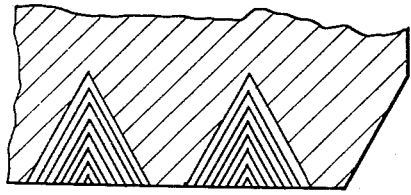
Figure 12:
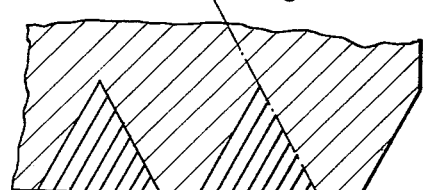
Figure 13:
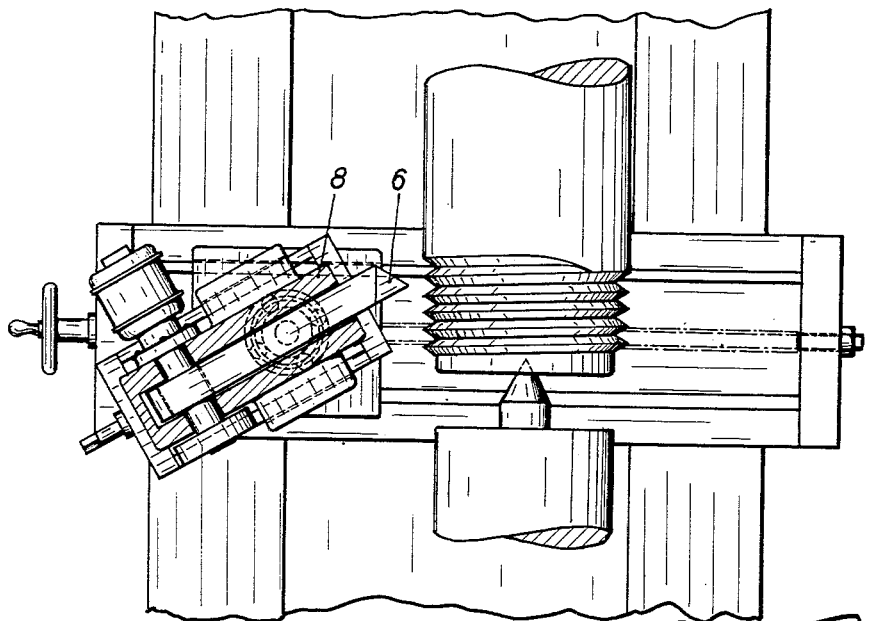

The oscillating or reciprocating drives for the tool holder, described above and designed as eccentric, or crank drives, may be replaced by equivalent electric, hydraulic or pneumatic means.

While the invention has been described in detail with respect to certain now preferred examples and embodiments of the invention it will be understood by those skilled in the art after understanding the invention that various changes and modifications may be made without departing from the spirit and scope of the invention and it is intended, therefore, to cover all such changes and modifications in the appended claims.

What I claim is:

1. An apparatus for machining the surface of cylindrical workpieces, comprising a chuck, a tool holder, consisting of two parts, a pin for jointedly connecting the two parts, the tool holder part facing away from the workpiece comprising an oscillating cam drive adapted to move the tool holder in a radial direction to the axis of the workpiece, and the second tool holder part comprising an oscillating crank drive adapted to reciprocate the tool holder with the tool in a traverse direction to the axis of the workpiece and a third oscillating cam drive acting upon the pin joint of the two tool holder parts and serving to direct the tool to follow the peripheral line of the workpiece during the curved cutting course of the tool.

2. An apparatus according to claim 1, having a fourth cam drive imparting to the tool a vibratory pendulous motion in a direction parallel to the workpiece axis causing said tool to cut alternately a short chip from each thread flank with each transverse motion of said tool.

References Cited in the file of this patent

UNITED STATES PATENTS

| Number | Name | Date |
|---|---|---|
| 160,161 | Clay | Feb. 23, 1875 |
| 276,292 | Seymour | Apr. 24, 1883 |
| 377,761 | Jones | Feb. 14, 1888 |
| 416,584 | Dorman | Dec. 3, 1889 |
| 701,217 | Montreuil | May 27, 1902 |
| 1,030,439 | Walker | June 25, 1912 |
| 1,292,494 | Lorenz | Jan. 28, 1919 |
| 1,565,264 | Dubi | Dec. 15, 1925 |
| 1,893,916 | Waldrich | Jan. 10, 1933 |
| 1,916,581 | O'Brien | July 4, 1933 |
| 2,029,385 | Perkins | Feb. 4, 1936 |
| 2,176,265 | Luers | Oct. 17, 1939 |
| 2,330,156 | Stoen | Sept. 21, 1943 |
| 2,355,512 | Contratto | Aug. 8, 1944 |
| 2,424,473 | Luers | July 22, 1947 |

OTHER REFERENCES

American Machinist, September 4, 1930, pages 381–382 and 383.